Patented Apr. 4, 1944

2,345,600

UNITED STATES PATENT OFFICE 2,345,600

ALUMINA GEL CATALYSIS

Llewellyn Heard, Hammond, Ind., and Rodney V. Shankland and James C. Bailie, Chicago, Ill., assignors to Standard Oil Company, Chicago, Ill., a corporation of Indiana No Drawing. Application August 7, 1942, Serial No. 453,930

14 Claims. (Cl. 196—50)

This invention relates to improved methods of using alumina gel catalysts and it pertains more particularly to using catalysts for hydroforming or dehydroaromatization (aromatization) of naphthas.

An object of the invention is to provide an improved method of using an alumina-molybdena catalyst or equivalent catalyst which is highly superior to any catalyst of this type heretofore known to the art for hydroforming and aromatization, and particularly for the production of toluene from light naphtha fractions. The best commercial catalyst for this purpose heretofore known to the art is one containing about 9% of molybdenum oxide on activated "Alorco" alumina. The catalyst used is more than twice as effective as this prior catalyst. To produce a given yield of toluene from Mid-Continent light naphtha more than twice the through-put can be employed with the present catalyst under otherwise constant operating conditions. The present catalyst produces approximately 25% more toluene from a given charging stock than can be produced by the prior catalyst under the same operating conditions. It produces a toluene cut which is enormously richer in toluene under equivalent operating conditions than an equivalent cut produced by the prior catalyst. Along with these remarkable and unexpected improvements in the quantity and quality of product yields, the present catalyst produces remarkably small amounts of carbon, is remarkably heat stable and retains its activity for long periods of time. The object of our invention is thus to use a catalyst for hydroforming or aromatization (and toluene production) which is outstandingly superior to any catalyst heretofore known to the art.

A further object of our invention is to define the optimum method of making a toluene producing catalyst and the optimum conditions to be employed in each step of said method.

A further object is to provide an improved method of making toluene which will eliminate the necessity of an enormous amount of fractionating equipment heretofore required for the separation of toluene from hydrocarbons of approximately the same boiling range. A further object of the invention is to produce toluene of substantially nitration grade directly from an aromatization fractionating system without employing solvent extraction, azeotropic distillation or extractive distillation steps. Other objects will be apparent as the detailed description of the invention proceeds.

The urgency of obtaining maximum possible amounts of toluene from available charging stocks in available plants (and plants under construction) has required extensive research on catalysts. It has been found that a catalyst of the type described in United States Patent 2,274,634 was superior to the best previously known commercial catalyst (molybdena on Alorco alumina) in that it produced higher yields of higher octane number gasolines from ordinary naphtha and particularly from heavier naphtha and at the same time produced less coke and had better life characteristics. When the catalyst of United States Patent 2,274,634 was employed with a light naphtha charging stock it produced the advantages of larger yields, higher octane number, lower coke deposits, etc. than the best commercial catalyst available but the toluene yields were about the same as the toluene producible from the commercial catalysts. In producing a product of equivalent octane number the toluene yields of said catalyst were even lower than the toluene yields of the commercial catalyst. With further extensive work on this subject we have discovered that by making an alumina catalyst of the general type described in United States Patent 2,274,634 and by subsequently impregnating this catalyst with ammonium molybdate to obtain a $MoO_3$ deposit thereon, we obtain a final catalyst of remarkably superior toluene producing characteristics. Although the analysis of the present catalyst is substantially the same as that of the commercial catalyst heretofore employed we have found that with practical economic space velocities for commercial operation (for example about 1 v./v./hr.) the present catalyst produces about 25% more toluene from a given charging stock, that the toluene concentration in the 204–255° F. cut is much greater than with the previous commercial catalyst, that the carbon deposit on the present catalyst is remarkably low and that even at relatively high space velocities we can produce large yields of substantially pure toluene without unduly expensive fractionation equipment. The present catalyst is also valuable for hydroforming heavy naphtha and other naphthas.

In a preferred example of our improved process we produce from amalgamated aluminum an alumina sol which contains from about 3 to 8%, preferably about 5 to 6%, of alumina using formic or acetic acid as a peptizing agent, using final acid concentrations of about 2 to 6% and employing temperatures substantially above 160° F. This alumina sol is of such concentration that it will set rather quickly into a vibrant gel or jelly without dehydration or addition of electrolytes. However, we may expedite gelation by the addition of electrolytes such as ammonium carbonate and the electrolyte may contain a catalyst component, i. e., may be ammonium molybdate or the like. The sol is gelled in thin layers, dried at about 150 to 180° F. until the bulk of the moisture is removed therefrom, heat treated by gradually and slowly raising the temperature from 950 to 1000° F. in the presence of an inert gas stream and with carefully controlled amounts of oxygen for effecting dehydration and decarbonization of the resulting gel and the decarbonized gel is then calcined at about 1100° F. for a period of at least about 24 hours although we may employ lower temperatures for a longer period of time or higher temperatures for a shorter period of time. The calcined gel is then impregnated with ammonium molybdate in order to incorporate in or on the catalyst about 9% of $MoO_3$. After the impregnation step the catalyst is again heat treated to decompose the ammonium molybdate and to give the desired alumina molybdena catalyst. This catalyst is crushed to such an extent that substantially all of the crushed particles pass the 30 mesh screen and not more than 50% of the particles pass the 100 mesh screen. An organic pelleting agent such as the commercial product Sterotex, in powdered form, is then mixed with the crushed catalyst and the mixture is pelleted. The pellets should be about 1/8 inch to 3/8 inch in diameter and the pelleting pressure should be such as to produce a lateral crushing strength ranging from at least about 2 pounds in the case of the 1/8 inch pellets to at least about 20 pounds in the case of the 3/8 inch pellets.

One of the important features is the elimination of any inorganic impurities which are inevitably associated with alumina gels made by prior processes. The use of the amalgamated aluminum process not only insures the necessary catalyst purity but provides a reproducible and fool-proof method of obtaining a uniform product of high activity.

Another feature of making the catalyst is the impregnation of the gel preferably after the drying and heat treating steps so that the molybdenum oxide is on the outer surface of the resulting catalyst. A part of the molybdenum oxide may be incorporated in the gel itself in accordance with the teachings of United States Patent 2,274,634 but at least a part of the molybdenum oxide should be impregnated on the surface of the finished gel in order to produce the toluene-directive catalyst of the present invention. The present catalyst produces a slightly higher carbon deposit than a similar catalyst which contains no molybdenum oxide impregnated on its outer surfaces but the remarkable toluene-directive effect of the catalyst more than compensates for its slightly increased tendency toward carbon formation.

When treating a Mid-Continent light naphtha of about 190 to 260° F., under a gauge pressure of about 200 pounds per square inch, with a 6 hour reaction period and a space velocity of about 1 volume of liquid feed per hour per volume of catalyst space in the presence of about 2500 cubic feet of hydrogen per barrel of stock charged, we obtain a 55 to 60% liquid yield of a product of about 92 octane number with only about .3% carbon production. This liquid product contains about 19% toluene based on charging stock or about 34% toluene based on liquid product and a fraction boiling within the range of about 205 to 255° F. contains about 98% toluene. When the best previously known commercial catalyst is employed with the same stock and under the same conditions it produces about a 73% yield of a product of only about an 80 octane number, about 15½% of toluene based on charging stock, about 21.3% toluene based on liquid product and the 205-255° F. product cut only contains about 60% of toluene. Thus with this prior catalyst it was necessary to employ solvent extraction, azeotropic distillation or extractive distillation for obtaining nitration grade toluene while with the use of our catalyst substantially pure toluene can be recovered without these expensive fractionation steps. To obtain a given yield of toluene from this light naphtha charging stock the present catalyst can be operated from two and a half to three times the space velocity required with the best previously known commercial catalyst which means that a given commercial catalyst chamber will have two and a half to three times its present productive capacity. For obtaining the same concentration of toluene in the crude toluene fraction of the product the present catalyst can be operated at about four times the space velocity used with the best previous commercial catalyst so that on this basis a given commercial catalyst chamber will have four times its present productive capacity. A similar comparison also holds with activity for producing liquid product of a given octane number.

Our invention will be more clearly understood from the following detailed description of a commercial method of making the present catalyst and from specific examples showing the new and unexpected results obtained by the use of the present catalyst in hydrocarbon conversion processes.

For making about 5000 pounds per day of finished pelleted catalyst we employ about 75,000 to 80,000 pounds per day of distilled or pure water, about 1,500 to 2,500 pounds per day of acetic acid or formic acid and about 2,300 to 2,500 pounds per day of metal aluminum. The mercury employed in the present process is continuously recycled and the total requirements for make-up amount to only 1 or 2 pounds per day.

We may employ two reaction tanks which are preferably lined with glass or other ceramic material. Wooden tanks may be employed provided that they are previously treated to prevent undue foaming in the reaction. It is essential, however, to prevent contamination of the alumina with metallic or inorganic impurities. Two reaction tanks may be employed each about 12 feet in diameter by about 7 or 8 feet in height, each being provided with a high speed agitator or mixer (also preferably glass-lined) with suitable reflux means for condensing and returning to the reaction vessel the water and acid which may vaporize therefrom and with suitable heat exchange coils for initially bringing the mixture to reaction temperature and for extracting heat from the reaction mixture during the course of the reaction. The reflux means, heat exchange means as well as the mixer should be glass lined or provided with equivalent means for preventing catalyst contamination.

Half of the water together with enough formic or acetic acid to give an initial acid concentration of about ½ to 1% is charged to one of the reactors together with about 150 to 250 pounds of a mercuric nitrate solution prepared by dissolving mercury in 50% nitric acid. When acetic acid is employed as the peptizing agent the initial concentration should not be appreciably higher than 1% and is preferably of the order of .7%, but when formic acid is used we may employ higher initial concentrations, i. e., we may use about 1 to 1½% formic acid. The dilute acid solution together with a small amount of mercuric nitrate is heated to a temperature upwards of 160° F. but below 212° F. and about 1200 pounds of metallic aluminum is added to the hot mixture with rapid stirring. The reaction proceeds vigorously with the liberation of hydrogen apparently in accordance with the following formula:

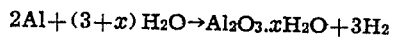

$$2Al + (3+x) H_2O \rightarrow Al_2O_3 \cdot xH_2O + 3H_2$$

In the case of acetic acid a rather heavy froth is produced and the acid concentration and temperature should be controlled to prevent undue amounts of such froth. When formic acid is employed the resulting sol is less viscous and hence the foaming difficulties are not as great so that higher initial acid concentrations may be employed and the reaction may be effected more quickly. The amount of mercuric nitrate is not critical but should be sufficient to provide an amalgamated surface on the metal aluminum which may be added in the form of thin metal sheets or granules or billets. The mercury is eventually recovered and redissolved in nitric acid so that a slight excess of mercuric nitrate is of no particular consequence. It should be understood that the mercury may be supplied in the form of mercuric oxide or in any other form which will not lead to the introduction of objectionable impurities.

When the reaction has visibly slowed down additional acid is added to the solution and the vigorous stirring is continued. The additional acid may be added continuously or stepwise and the time required for total addition of the acid may range from a few hours in the case of formic acid to 8 or 10 hours or more in the case of acetic acid. The final acid concentration in the case of acetic acid should be within the approximate range of 1½ to 3% and in the case of formic acid may be within the approximate range of 3 to 9%, for example about 5%. The reaction may be continued for several hours after the final acid has been added in order that the alumina concentration in the sol may be built up to about 5 to 6% or within the somewhat broader range of 3 to 8%. Throughout the course of this reaction the temperature should be substantially above 160° F. but below about 210° F., i. e., of the order of about 180° F. or 190° F. A sample of the sol may be analyzed to determine when a desired alumina concentration has been reached. In determining the concentration of the alumina in the sol at this stage by evaporating a weighed sample to dryness and igniting, the final weight must be carried out very quickly since the remaining gel is far more hydroscopic than ordinary alumina gels.

When the concentration of alumina in the sol has reached about 5 or 6% the stirring is discontinued and the mercury and undissolved aluminum is allowed to settle out. This settling may require an hour or so. The settled mercury may be withdrawn, redissolved in 50% nitric acid and introduced into the other bath reactor or subsequently returned to the same reactor for further use. Any undissolved aluminum may be left in the reactor for use in the next batch. The sol which is thus produced contains so much alumina that it will set into a vibrant gel if it is allowed to stand for a very long period of time and it is, therefore, desirable to transfer the sol to trays or a drying system rather promptly.

An outstanding feature of the formic acid sol is the fact that it is less viscous than the acetic acid sol in the first place, that it is transformed into the vibrant gel stage through a gradual transition period (rather than by abrupt gelation) and that after it has started to gel or jelly it may be returned to the sol state by vigorous mechanical stirring. The system should, of course, be designed to prevent transfer lines from becoming plugged with solid gel. If a tank of the acetic acid sol sets into a gel before it is transferred to the drying pans or the drying system it will be necessary to "dig out" the resulting gel. The incipient formic acid gel may be reconverted to a sol by use of the high speed mechanical mixer if stirring is prompt and vigorous.

As the sol is transferred to trays or surfaces for gelation and subsequent drying we may admix an electrolyte with it for expediting gelation (as described in United States Patent 2,274,634). Ammonium carbonate is a preferred electrolyte for this purpose but it should be understood that various other electrolytes may be employed. Ammonium molybdate or other electrolytes containing a catalyst ingredient may be incorporated into the gel at this time for the purpose of improving the catalytic activity as well as expediting gelation. In any case, the electrolyte should be added to the alumina sol with rapid stirring immediately before the sol is introduced to trays or onto a belt or drum for gelation and subsequent drying. To prevent gelation of a large body of catalyst material in a mixing tank we may pass a stream of the sol through one line and a stream of an electrolyte through another line through a mixing chamber or high speed mechanical mixer, and discharge the mixture promptly directly onto the surfaces on which gelation and drying are to be effected. The gel may set without electrolyte addition or drying in a matter or minutes and when an electrolyte has been added, in a matter of seconds.

The thickness of the sol in the trays or on the surfaces of the belt or drum which may be employed should be less than 1 inch and should preferably be less than ¼ inch. The sol sets to a gel very quickly on contact with such surfaces and we prefer to have the sol converted into a vibrant gel before the beginning of the drying step in order to insure the production of a gel structure of desired physical and catalytic properties. If the sol were sprayed into a drying tower there might be undesirable dehydration before gelation and there might be a tendency for the sticky material to adhere to the walls of the chamber. We, therefore, prefer gelation in the form of thin sheets and the subsequent drying of the sheets of vibrant gel.

A tray dryer for our system may be about 10 feet by 20 feet by 25 feet and may be designed for arranging shallow aluminum trays compactly but with a sufficient space over each pan for the circulation of air which is passed through the drying chamber by blowers. About 80,000 pounds of alumina sol may be charged to such a drying oven and the drying operation may require about 48 hours (so that two such drying ovens are required in the specific example herein described). The temperature of these drying ovens is maintained within the approximate range of 150 to 180° F., preferably 160 to 170° F. although the temperature may be increased toward the end of the drying step. In this drying step the bulk of the water is removed from the gel so that the dried gel will have an alumina content of about 30 to 60%, usually about 50% and may contain substantial quantities of formic or acetic acid along with a trace of nitrates. It should be understood, however, that the catalyst making is not limited to the use of a tray dryer but that it is equally applicable to the use of a moving belt for conveying the thin sheets of vibrant gel through a drying oven or to the use of a rotating drum and the distribution of a thin layer of the sol on the drum so that it sets almost instantaneously to a vibrant gel and is thereafter dried in a relatively short period of time. When the gel is dried in thin layers the resulting product is in the form of flakes while the drying in thicker layers results in a granular structure having a particle size of about 8 mesh and smaller.

The oven dried material is next placed in a closed vessel or chamber usually referred to as a "decarbonizer" wherein it is gradually heated to a temperature of about 950 to 1000° F. in the presence of an inert gas stream such as nitrogen, carbon dioxide or flue gas. The temperature rise in this dehydration and decarbonizing step should be relatively slow and uniform and it usually requires about 4 to 8 hours. Small amounts of air may be employed along with the inert gas for the controlled combustion of carbonaceous material or other combustible material but this combustion should be very carefully controlled and the temperature rise should be slow and gradual in order to produce a finished gel of desired physical and catalytic properties. At the end of this heat treating step combustible material will have been substantially eliminated from the gel. The gel prepared from the acetic acid sol may contain substantial quantities of acetic acid which must be removed in this heat treating or decarbonizing step and this necessitates the combustion of about 2% of carbonaceous material from the gel. When formic acid is employed instead of acetic acid this heat treating or decarbonization step is enormously simplified because the formic acid is largely eliminated as carbon monoxide and water so that there is little or no likelihood of impairing the catalyst by too rapid a combustion of carbonaceous material.

The heat treatment and decarbonization of the gel does not produce a catalyst of maximum effectiveness and the next step of the making is therefore the calcining of the heat treated gel at a temperature of the order of about 1100° F. for a period of about 24 hours. In the calcining step it is not so important to control the amount of free oxygen in the heating gases because combustible material has already been substantially eliminated. The function of the calcining step is evidently to convert the resulting catalyst gel into a more active catalyst form. The calcining may be at higher temperatures, i. e., temperatures of the order of 1200 to 1400° F. for a correspondingly shorter period of time or it may be effected by heating at about 1000 to 1050° F. for a much longer period of time. In fact, the calcining of the catalyst may be effected in catalyst regenerations after the catalyst is placed on stream but in this case the initial activity of the catalyst will be lower than its activity after the regenerations required for obtaining the necessary calcining. The calcining step may be of longer duration than hereinabove indicated but at least 24 hours at about 1100° F. or the equivalent thereof is apparently the minimum for obtaining optimum catalyst activity.

The dried heat treated and calcined gel is next impregnated with an ammonium molybdate solution. About 600 pounds per day of ammonium molybdate dissolved in 6000 pounds per day of water is introduced into a molybdate make-up tank. About 1100 pounds of this solution and about 750 pounds of the calcined catalyst are introduced into an impregnating tank which may be about 3 feet in diameter by about 4 feet high and allowed to soak for 2 or 3 hours for obtaining the desired impregnation. During the impregnation step the impregnating tank may be repeatedly or periodically evacuated by a jet condenser and repressured in order to dispel air or occluded gas from the catalyst particles and insure adequate impregnation. After the impregnation step any remaining liquid may be drawn off through a drain line and returned to the molybdenum make-up tank for recycling and the impregnated catalyst is then introduced into a decomposer wherein it is slowly and gradually heated to a temperature of about 1000° F. in a period of approximately 3 hours for decomposing the ammonium molybdate so that the final catalyst will be an alumina gel impregnated with molybdenum oxide. In this particular example the impregnation and the decomposing steps are on a 4-hour cycle basis so that in a 24-hour operating period approximately 4500 pounds of calcined gel are impregnated and approximately 5000 pounds of impregnated catalyst is produced. It should be understood of course that the catalyst making is not limited to this particular impregnation cycle nor to the particular amount of impregnating agent herein set forth, the above amounts being required for producing a catalyst containing approximately 9% of molybdenum oxide on the surface of the calcined alumina gel. In making the present catalyst at least about 9% of molybdenum oxide should be employed for obtaining optimum results and that even higher amounts of molybdenum oxide may be used but taking all considerations into account, it is usually not desirable to incorporate more than about 12 to 15% of molybdenum oxide on the calcined gel.

The resulting catalyst is now entirely suitable for use in small scale or test work but it is unsuitable for large commercial installations because the flakes or large catalyst grains do not possess the necessary mechanical strength. If this flake or granular catalyst material were charged into a large commercial reactor the catalyst would tend to pack and produce unduly high pressure drops—the packing of the catalyst in parts of the reactor would lead to channeling in other parts of the reactor. For commercial operation we therefore pellet this catalyst material in sizes ranging from about 1/8 to 3/8 inch. The pelleting agent or lubricant must be carefully selected to avoid the introduction of any deleterious impurities and after extensive research we have found that the commercial product Sterotex, in the form of a fine white readily flowable powder, produces excellent results. Other organic binders such as wood rosin, graphite, stearic acid and ordinary flour, etc. may be used but the commercial product Sterotex in powdered form appears to be superior to anything heretofore tested.

In pelleting procedures heretofore employed the catalyst has been ground in a ball-mill to relatively small particle size before pelleting but it appears that such procedure impairs the activity of the present catalyst and increases its tendency toward carbon formation. However, by simply crushing or grinding the catalyst granules or flakes so that substantially all of the particles will pass a 30 mesh screen but at least about 50% of said particles will be retained on a 100 mesh screen and by using about 1 part of the pelleting agent (together with the necessary amount of water) to about 5 to 15 parts, for example about 7½ parts, of ground catalyst, we may obtain pellets of the necessary mechanical strength and these pellets retain the activity, the toluene directive properties and the low carbon-forming properties of the granular or flake catalysts. The ⅛ inch pellets should have a lateral crushing strength of at least about 2 pounds and the larger sized pellets should have higher crushing strengths, the ⅜ inch pellet for example should have a lateral crushing strength of at least 20 pounds. The catalyst may be pelleted in the form of cylinders or pills and it is immaterial whether or not the pills are subsequently somewhat crushed because the fragments of these pellets are fully as active and in some cases are even more active than the pellets themselves. It appears that the voids between the large catalyst particles are substantially filled by the smaller catalyst particles and that a certain bond is established between these particles in the pelleting operation without destroying the gel structure (analogous to the cementing of crushed rock, sand and gravel in ordinary concrete). The relatively large particles in the finished pellets thus preserve the desired porosity and we thus obtain all of the advantages of the granular or flaked catalyst with the added advantage of high mechanical strength.

The pelleted catalysts may be charged directly into a large cylindrical reactor and the Sterotex pelleting agent may be burned from the pellets while they are in situ in the reactor. We will describe the use of the present catalyst for making toluene from a Mid-Continent light naphtha having a boiling range of approximately 200 to 260° F. More specifically, this light naphtha has an A. P. I. gravity of 61.0, an initial distillation point of 196° F., 10% point of 208° F., 50% point of 219° F., 90% point of 239° F. and end point of 258° F. It has an A. S. T. M. octane number of about 55. Analysis of this particular charging stock will be hereinafter set forth in comparison with the analysis of products obtained from the use of the best commercial catalyst heretofore known and from the use of the improved catalyst of the type hereinabove described. It should be understood, however, that our invention is not limited to any particular charging stock since the catalyst may be employed with a wide variety of charging stocks at various boiling ranges and from various sources.

When this particular light naphtha charging stock is contacted with the pelleted catalyst at a temperature of about 980° F., at a pressure of about 200 pounds per square inch for a reaction period of about 6 hours, at a space velocity of about 1 volume of liquid feed per hour per volume of catalyst space and with about 2500 cubic feet of hydrogen per barrel of naphtha charged, we obtain a 56% yield of a liquid product of about 92 octane number, an A. P. I. gravity of about 46.3. The toluene production based on original feed is 19% and based on liquid product is 34%. The product fraction boiling between 204 and 255° F. contains about 98% toluene.

When the same stock is treated under approximately the same conditions but with a space velocity of 2 volumes of charging stock per hour per volume of catalyst space, we obtain about a 64% yield of a product of 86 octane number. In this case the toluene production amounts to 16% based on charging stock or a little more than 25% based on product and the 204–255° F. cut contains about 80% of toluene.

The carbon residue in the first example (with a space velocity of 1) was about .3% and in the second example (space velocity of about 2) was only about .14%.

When hydroforming a 35 A. S. T. M. octane number heavy naphtha (about 250–400° F.) with the present catalyst containing 6% of MoO₃ impregnated thereon and employing a temperature of about 980° F. and space velocity of about 1 v./v./hr. we obtain a 68% product yield characterized by an A. S. T. M. octane number of 90 or more and a carbon formation of about 1.1%.

When hydroforming the same heavy naphtha under the same conditions with a catalyst containing 6% of co-gelled MoO₃ and 6% of MoO₃ added by impregnation we obtain a product yield of 71.3%, an A. S. T. M. product octane number of 91 or more, and a carbon formation of 1.26%.

The remarkable superiority of the present catalyst over the best known prior commercial catalyst for toluene production will be seen from the following table of results obtained by the treatment of a Mid-Continent 196–258° F. fraction of light naphtha at about 980° F. under a pressure of 200 pounds per square inch with a 6-hour reaction period in the presence of 2500 cubic feet of hydrogen per barrel of naphtha charged.

*Table*

| | Feed | Best prior art commercial catalyst | | Catalyst herein described | |
|---|---|---|---|---|---|
| Space velocity, $V_v/hr./V_c$ | | 1.90 | 0.94 | 2.01 | 1.00 |
| A. S. T. M. O. N. of liq. prod. (100% C₄ ret.) | 55.2 | 73.6 | 80.4 | 86.4 | 91.6 |
| *Yields based on feed* | | | | | |
| Wt. % carbon | | 0.10 | 0.16 | 0.14 | 0.19 |
| Wt. % dry gas | | 10.8 | 20.9 | 25.5 | 33.1 |
| Vol. % C₄'s | | 3.0 | 6.3 | 9.7 | 11.8 |
| Vol. % C₅'s | | 4.4 | 4.7 | 5.5 | 7.3 |
| 120–204° F.: | | | | | |
| Vol. % benzene | 0.3 | 2.3 | 3.1 | 3.1 | 4.4 |
| Vol. % naphthenes | 12.9 | } 28.2 | 22.1 | 10.2 | 3.3 |
| Vol. % paraffins | 22.3 | | | | |
| Vol. % toluene | 2.2 | 13.0 | 15.8 | 16.0 | 19.0 |
| Vol. % MCH+ECP³ (204–228° F.) | 13.1 | 2.4 | 0.4 | 0.3 | 0 |
| 204–255° F.: | | | | | |
| Vol. % other naphthenes (228–255° F.) | 12.7 | } 20.8 | 10.3 | 3.8 | 0.4 |
| Vol. % paraffins (204–228° F.) | 11.8 | | | | |
| Vol. % paraffins (228–255° F.) | 16.1 | | | | |
| 255–300° F.: | | | | | |
| Vol. % xylenes | 0.7 | 11.0 | 11.9 | 12.7 | 11.6 |
| Vol. % naphthenes | 2.2 | } 1.2 | 0.5 | 0.2 | 0 |
| Vol. % paraffins | 4.3 | | | | |
| >300° F.: | | | | | |
| Vol. % higher aromatics | | | | | |
| Vol. % higher naphthenes +paraffins | } 1.4 | { 1.5 | 1.6 | 2.9 | 2.6 |
| Vol. % total aromatics | 3.2 | 27.8 | 32.4 | 34.7 | 37.6 |

¹ 225–270° F. in case of feed.
² >270° F. in case of feed.
³ Methyl cyclohexane+ethyl cyclopentane.

From the above tabulated results it will be noted that the present catalyst produces remarkably higher product octane numbers with only a negligible increase in carbon production. The increased dry gas yields show the superior dehydrogenating properties. The yield of butanes (valuable for production of synthetic rubber, aviation gasoline, etc.) is practically doubled and the yield of pentanes (valuable for aviation fuel) is markedly increased. The low boiling naphthenes and paraffins are about 28 to 22% in the case of the best prior catalyst and are reduced to about 10 and 3% respectively with the present catalyst. The prior art catalyst produces only 13 and 15.8% toluene while the present catalyst produces 16 and 19% toluene respectively. The paraffins in the toluene boiling range remaining in the product with the prior art catalyst amounted to over 10% with the low space velocity. With the present catalyst the amount of such paraffins was reduced to below ½ of 1%. This last feature is of extreme importance in the fractionation and purification steps since it enables enormous savings to be effected in requirements for plant constructions and in the cost of plant operations. The feature of employing charging stocks of specific narrow boiling range in order to obtain relatively pure toluene and xylene are described and claimed in a copending application Serial 453,929 which was filed on August 7, 1942.

In these specific examples the temperature was about 980° F. but it should be understood that temperatures within the approximate range of 900 to 1050° F. may be used; the pressure was approximately 200 pounds per square inch but pressures within the range of 50 to 400 pounds per square inch may be used; the space velocities were about 1 but space velocities ranging from about .1 to 5 or more may be used. Hydrogen was employed at the rate of about 2500 cubic feet per barrel of stock charged but the amount of hydrogen may vary from about 1000 to 5000 cubic feet per barrel of stock charged. The on-stream period in the above examples was approximately 6 hours but on-stream periods may range from about 1 to 12 hours or more. For obtaining maximum octane numbers or maximum amounts of toluene in the toluene fraction, space velocities should preferably be less than 1 although generally speaking we may employ much higher space velocities with the present catalysts than can possibly be used with the present known commercial catalysts without sacrificing yields or octane number improvement and we will obtain even a less amount of carbonaceous deposit for given yields and octane numbers under any given operating conditions than is obtained in any known commercial catalyst heretofore used for this purpose.

While the present catalyst may be employed for hydroforming or isomerizing heavy naphthas as well as light naphthas, for example naphthas boiling within the approximate range of 250 to 400° F. or naphthas boiling within the approximate range of 100 to 400° F., where the desired result is a high octane number motor fuel we usually employ higher space velocities than when the desired result is obtaining maximum toluene production of maximum purity.

An outstanding feature of the present catalyst is its stability at high temperatures and for extended periods of use. The best prior commercial catalyst gradually loses its aromatizing and toluene-producing properties with extended periods of use but the present catalyst shows remarkably high activity and toluene producing properties even after 200 to 300 cycles of operation (each cycle being a 6-hour on-stream period and a 6-hour period of purging, regeneration, etc.). Thus the total amount of high octane number motor fuel or toluene producible from a given amount of catalyst is enormously higher in the present catalyst than in any prior commercial catalyst heretofore known in the art.

While our invention has been described in connection with a specific catalyst composition in which molybdenum oxide has been incorporated on an improved alumina gel in an amount of approximately 9%, it should be understood that the molybdena concentration may range from about 5 to 15% and that the molybdena may be obtained from some other decomposable salt or compound than ammonium molybdate. Many features of our invention are also applicable when the ignited gel is impregnated with a decomposable salt or compound of chromium, tungsten, vanadium or other known catalyst having aromatizing properties provided, of course, that the salt or compound be free from any substances which might remain on the catalyst after the decomposing or igniting step and which might deleteriously affect the finished catalyst.

The impregnating step may be either before or after the calcining step but it should preferably be after the decarbonizing step, i. e., after the alumina gel has been freed from water of hydration so that it will have the maximum porosity when subjected to the impregnating step.

While the invention has been described in connection with a fixed bed conversion system it should be understood that the invention is equally applicable to moving bed systems or powdered fluid-type systems wherein finely divided catalyst is suspended in the stream of reaction vapors. In all cases, of course, it is necessary to periodically regenerate the catalyst but since such catalyst regeneration is well known in the art and since no special precautions or operating conditions have to be employed for the present catalyst, a detailed description of the catalyst regeneration is unnecessary.

While we are unable to explain the remarkable new and unexpected results which are obtained by the use of the present catalyst, we believe that an important factor is the high degree of purity which is insured by the use of pure metallic aluminum for making the sol and the avoidance of the possibility of any contaminants. However, the freedom from impurities is only one factor which contributes to our new and unexpected results. Another important factor is the production of the proper type of alumina gel. Another factor is the drying, heat treating and calcining of the dried alumina gel. The drying temperature may be much higher when very thin sheets are dried on a heated drum than when thicker sheets are dried in pans. In the calcining step the alumina apparently undergoes some sort of conversion into a more highly catalytically active form. Another factor is the incorporation of the molybdenum oxide on the surface of the gel, particularly when the catalyst is to be employed for toluene production as distinguished from maximum yields of high octane number motor fuels.

While we have described in detail a specific example of catalyst preparation and specific examples of catalyst use, it should be understood that our invention is not limited to any of the details hereinabove set forth since many modifications and alternative operations and operating conditions will be apparent from the above description to those skilled in the art.

We claim:

1. The method of converting hydrocarbon oils which comprises subjecting said oils under conversion conditions to the action of a solid catalyst prepared by reacting amalgamated aluminum with water in the presence of a dilute organic acid peptizing agent to form an alumina sol containing an amount of alumina in the approximate range of 3 to 8%, gelling a thin layer of said sol, drying said gel at a temperature substantially below the boiling point of water until the bulk of the water has been removed therefrom and the dried gel contains about 30 to 60% of alumina, then subjecting the dried gel to heat treating, dehydration and decarbonization by slowly and gradually increasing its temperature while maintaining it in a closed treating zone, passing a hot inert gas through said treating zone together with regulated amounts of oxygen under conditions for substantially dehydrating said gel and burning combustible materials therefrom without deleteriously affecting the gel structure, impregnating the dehydrated catalyst with a decomposable molybdenum compound under such conditions as to leave about 5 to 15% of molybdenum oxide on the finished catalyst and decomposing the molybdenum compound by heating the impregnated catalyst slowly to a high temperature and calcining the dehydrated gel for an extended period of time at a higher temperature than that to which the catalyst is to be subjected in the conversion step.

2. The method of claim 1 wherein the peptizing agent is formic acid and wherein the initial concentration of the formic acid for forming the alumina sol is within the approximate range of ½ to 2% and wherein additional formic acid is added as the reaction proceeds so that the final formic acid concentration is within the approximate range of 2 to 6%.

3. The method of claim 1 wherein the initial drying step is effected within the approximate temperature range of 150 to 180° F., wherein the heat treating step for dehydration and decarbonization is prolonged for at least several hours during which the temperature of the dried catalyst is increased to a point within the general vicinity of about 950 to 1000° F. and wherein the calcining step amounts to a heat treatment at a temperature in the general vicinity of about 1100° F. for a period of at least about 24 hours.

4. The method of claim 1 wherein the preparation of the catalyst includes the further step of crushing the catalyst material after the impregnating and decomposing steps so that substantially all of the crushed catalyst particles will pass a 30 mesh screen and at least about 50% of the catalyst will be retained on a 100 mesh screen and pelleting the crushed catalyst with an organic pelleting agent to produce pellets of about ⅛ to ⅜ inch in height and diameter and of sufficient crushing strength to facilitate their use in large scale commercial units.

5. The method of converting hydrocarbon oils which comprises subjecting said oils under conversion conditions to the action of a solid catalyst prepared by reacting amalgamated aluminum with water in the presence of a peptizing agent of the class consisting of formic acid and acetic acid at a temperature substantially above 160° F. with rapid stirring, beginning said reaction with an acid concentration in the general vicinity of 1%, increasing the acid concentration as the reaction proceeds until an acid concentration is reached which will permit the formation of a sol having an alumina content within the approximate range of 3 to 8%, continuing the stirring at said high temperature until a sol of said alumina contact is obtained, separating the resulting sol from mercury and undissolved aluminum, gelling said separated sol in thin layers, drying said gel, heat treating said dried gel by slowly increasing its temperature up to about 950 to 1000° F. while passing an inert gas therethrough, calcining the heat treated gel at a temperature higher than 1000° F. for a period of at least about 24 hours and impregnating the heat treated gel with an amount of ammonium molybdate solution of such amount and concentration as to introduce about 5 to 15% of molybdenum oxide on the calcined gel and slowly heating the impregnated gel to a temperature of about 1000° F. for decomposing the ammonium molybdate and leaving $MoO_3$ on the gel.

6. The method of claim 5 wherein the acid is formic acid and wherein the final acid concentration of the alumina sol prior to gelation is within the approximate range of 3 to 5%, whereby the resulting sol may be converted into a gel without dehydration or the introduction of electrolytes, and the acid may be decomposed into carbon monoxide and steam in the heat treating step and thus eliminated from the dried gel.

7. The method of claim 5 wherein the concentration of acid peptizing agent and the duration of the reaction between amalgamated aluminum and water is so regulated as to obtain a sol having an alumina content of about 5 to 6%.

8. The method of claim 5 which includes the step of introducing regulated amounts of oxygen along with the inert gas in the heat treatment for burning carbonaceous deposits resulting from the occlusion of peptizing agent in the gel while preventing such rapid combustion as would deleteriously affect the catalyst structure.

9. The method of claim 5 which includes crushing the catalyst after the impregnation and decomposition steps to such an extent that substantially all of the particles will pass a 30 mesh screen but not more than 50% will pass a 100 mesh screen, pelleting the crushed catalyst particles into pellets of about ⅛ to ⅜ inch and of such crushing strength as to permit their use in large commercial conversion units.

10. The method of converting a naphtha fraction for obtaining high yields of aromatization products and only a very small amount of carbon deposits which method comprises contacting said naphtha with a catalyst consisting essentially of an alumina gel substantially free from alkali metal and ferrous metal impurities which gel has been prepared by the action of water on amalgamated aluminum metal to form a sol which is then converted into a vibrant gel, dried and slowly heated to a temperature in the general vicinity of about 1000° F., impregnated with a decomposable molybdenum compound in amounts sufficient to incorporate about 5 to 15% of molybdenum oxide on the finished catalyst which is substantially free from alkali metal impurities, and calcined at least to the extent of a heat treatment in the general vicinity of about 1100° F. for a period of about 24 hours.

11. The method of claim 10 which includes the step of crushing the catalyst so that substantially all of it will pass a 30 mesh screen but not more than approximately 40% will pass a 100 mesh screen and pelleting the ground catalyst with an organic pelleting agent to obtain pellets of such crushing strength as to permit their use in large scale commercial units.

12. The method of claim 10 wherein the naphtha fraction contains hydrocarbons boiling within the range of about 250 to 400° F. and wherein large yields of high octane number motor fuel are obtained.

13. The method of converting a naphtha fraction for obtaining large yields of aromatics which method comprises subjecting said naphtha fraction under conversion conditions to the action of a solid catalyst prepared by reacting amalgamated aluminum with water in the presence of a peptizing agent of the class consisting of formic acid and acetic acid at a temperature substantially above 160° F. with rapid stirring, beginning the reaction with an acid concentration in the general vicinity of about 1%, increasing the acid concentration as the reaction proceeds until an acid concentration is reached which will permit the formation of a sol having an alumina content within the approximate range of about 5 to 6%, continuing the stirring at said high temperature until a sol of approximately said alumina content is obtained, separating the resulting sol from mercury and undissolved aluminum, gelling said separated sol in thin layers, drying said gel, heat treating said dried gel by slowly increasing its temperature up to about 950 to 1000° F. while passing an inert gas therethrough, adding regulated amounts of oxygen to the inert gas in said heat treating step for effecting decarbonization of the gel, calcining the decarbonized gel for a period of at least about 24 hours at a temperature in the general vicinity of about 1100° F., impregnating the calcined gel with sufficient ammonium molybdate to leave about 9% of molybdenum oxide on the finished catalyst, decomposing the impregnating agent by raising the temperature of the impregnated catalyst slowly to approximately 1000° F., crushing the impregnated catalyst so that substantially all of it will pass a 30 mesh screen but not more than about 50% will pass a 100 mesh screen, and pelleting the crushed catalyst with an organic binder into pellets of approximately 1/8 to 3/8 inch in diameter characterized by a crushing strength sufficient to facilitate their use in a large scale commercial unit.

14. The method of claim 13 which includes the further step of adding an electrolyte to the sol immediately before it is converted into gel and promptly distributing the mixture of sol and electrolyte on the surfaces for obtaining rapid gelation.

LLEWELLYN HEARD.
RODNEY V. SHANKLAND.
JAMES C. BAILIE.